(12) United States Patent
Nakamura et al.

(10) Patent No.: US 8,884,488 B2
(45) Date of Patent: Nov. 11, 2014

(54) STATOR FOR ELECTRIC ROTATING MACHINE AND MANUFACTURING METHOD OF THE SAME

(75) Inventors: Shigenobu Nakamura, Anjo (JP); Akira Takasaki, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/472,783

(22) Filed: May 16, 2012

(65) Prior Publication Data
US 2012/0223599 A1    Sep. 6, 2012

Related U.S. Application Data

(62) Division of application No. 12/984,772, filed on Jan. 5, 2011.

(30) Foreign Application Priority Data

Jan. 7, 2010 (JP) ................................. 2010-002148

(51) Int. Cl.
*H02K 3/38* (2006.01)
*H02K 15/12* (2006.01)
*H02K 3/12* (2006.01)
*H02K 3/04* (2006.01)
*H02K 15/00* (2006.01)

(52) U.S. Cl.
CPC *H02K 15/12* (2013.01); *H02K 3/12* (2013.01); *H02K 3/04* (2013.01); *H02K 3/38* (2013.01); *H02K 15/0081* (2013.01)
USPC ............... 310/201; 310/45; 310/71; 310/207; 310/208; 29/596; 29/606

(58) Field of Classification Search
CPC ........... H02K 15/12; H02K 3/04; H02K 3/12; H02K 3/38; H02K 15/0081
USPC ............... 310/45, 201, 207, 208; 29/596, 606
IPC ........................................................ H02K 3/38
See application file for complete search history.

(56) References Cited

U.S. PATENT DOCUMENTS 3,914,860 A * 10/1975 Schuler .......................... 29/596
4,724,345 A * 2/1988 Elton et al. ...................... 310/45

(Continued)

FOREIGN PATENT DOCUMENTS

JP       61-42245       2/1986
JP       07-322540     12/1995

(Continued)

OTHER PUBLICATIONS

Office Action (3 pages) dated Oct. 22, 2013, issued in corresponding Japanese Application No. 2010-002148 and English translation (5 pages).

(Continued)

*Primary Examiner* — John K Kim
(74) *Attorney, Agent, or Firm* — Nixon & Vanderhye P.C.

(57) ABSTRACT

A stator for an electric rotating machine includes a stator core which has a plurality of slots and a stator winding which is provided at the stator core. The stator winding has a plurality of conductor segments each of which includes an inner conducting body accommodated in the slot of the stator core and coil ends exposed from the slot, and weld portions which are connected with each other by welding the conductor segments at at least one of the coil ends. The weld portions are annularly disposed with an interval therebetween. The weld portions are coated with an insulating resin material. The resin material is formed of a plurality of layered insulating films.

5 Claims, 10 Drawing Sheets

(56) References Cited

U.S. PATENT DOCUMENTS

| | | | |
|---|---|---|---|
| 5,729,068 A * | 3/1998 | Gasparini et al. | 310/179 |
| 6,147,432 A * | 11/2000 | Kusase et al. | 310/260 |
| 6,333,573 B1 | 12/2001 | Nakamura | |
| 2003/0015932 A1 | 1/2003 | Oohashi et al. | |
| 2004/0007931 A1* | 1/2004 | Gorohata et al. | 310/180 |
| 2004/0145257 A1* | 7/2004 | Oohashi | 310/71 |
| 2011/0163620 A1* | 7/2011 | Nakamura | 310/71 |
| 2012/0223599 A1* | 9/2012 | Nakamura et al. | 310/45 |

FOREIGN PATENT DOCUMENTS

| | | |
|---|---|---|
| JP | 08-130843 | 5/1996 |
| JP | 2000-060051 | 2/2000 |
| JP | 2001-204151 | 7/2001 |
| JP | 2004-032892 | 1/2004 |
| JP | 2004-048999 | 2/2004 |
| JP | 2004-229460 | 8/2004 |

OTHER PUBLICATIONS

Office Action (3 pages) dated Oct. 22, 2013, issued in corresponding Japanese Application No. 2012-065676 and English translation (5 pages).

Final office Action issued in corresponding U.S. Appl. No. 12/984,772 on Jan. 8, 2014.

Japanese Office Action issued Feb. 27, 2014 in corresponding Japanese Application No. 2012-065676 (with English-language translation).

Japanese Office Action issued Feb. 27, 2014 in corresponding Japanese Application No. 2012-002148 (with English-language translation).

* cited by examiner

STATOR FOR ELECTRIC ROTATING MACHINE AND MANUFACTURING METHOD OF THE SAME

CROSS-REFERENCE TO RELATED APPLICATION

This application is a Division of application Ser. No. 12/984,772, filed Jan. 5, 2011, which is based on and claims the benefit of priority from earlier Japanese Patent Application No. 2010-2148 filed Jan. 7, 2010, the entire contents of each of which are hereby incorporated by reference.

BACKGROUND

1. Technical Field

The present invention generally relates to a stator for an electric rotating machine, such as an alternator or a motor-generator, installed in a vehicle, such as an electric vehicle or a hybrid vehicle, and to a manufacturing method of the stator.

2. Related Art

A stator for a vehicular electric rotating machine generally includes a stator core disposed opposed to a rotor and a stator winding provided at the stator core, as disclosed in JP-A-2001-204151. The stator winding in such a stator is made up of a plurality of conductor segments each having an inner conducting body accommodated in a slot of the stator core and coil end portions axially exposed from the slot and extended in both circumferential directions. Each conductor segment has a turn portion and slant portions that cross other conductor segments in a coil end. Each slant portion has a tip end which is provided with a weld portion. The coil end portions of the respective conductor segments are annularly disposed being substantially equally spaced apart from each other, with a plurality of weld portions of different conductor segments being joined to each other to provide a joint. Each of such joints is coated with an insulating resin material.

Similarly, in a vehicle alternator disclosed in JP-A-2000-60051, a predetermined number of pairs of a plurality of conductor segments are welded at coil end portions to form a winding. Each weld portion and the slant portion adjacent to the weld portion are coated with a resin material to achieve insulation between the weld portions, and between the weld portions and a perimeter frame. In addition, the annular provision of the resin material enhances rigidity at the weld portions of the stator and thus contributes to reducing vibration.

The coating such as of the weld portions of a stator is provided by a fluidized-bed coating process. In the fluidized-bed coating process, a powdered resin is located in a vessel and air is supplied to the powdered resin for agitation. Then, preliminarily superheated weld portions of a stator are immersed in the agitated powdered resin to melt the powdered resin with the heat of the weld portions to thereby provide coating on the surfaces of the weld portions. The fluidized-bed coating process is an organic solvent-free process and thus has an advantage of creating little environmental damage and having no coating loss in recovery and recycling.

However, the vehicle alternators as disclosed in JP-A-2001-204151 and JP-A-2000-60051 tend to use higher voltage (e.g. increased from 14 V to 42 V) in order to reduce weight and achieve higher efficiency in the vehicle wiring that accompanies the addition of various electrical loads and the increase of power consumption. Use of higher voltage is not limited to such vehicle alternators. For example, motor-generators installed such as in hybrid vehicles have practically come to use higher voltage for the same reason mentioned above and for increasing drive force as motors. Use of such higher voltage raises a problem of not ensuring insulation properties in the resin material mentioned above for coating the weld portions of the stator.

The reason that insulation properties are not ensured resides in the use of the fluidized-bed coating process for coating the weld portions with a resin material. In this coating process, the preliminarily superheated weld portions are immersed in the powdered resin material in a vessel. During the immersion, a number of voids (air) between the particles of the powdered resin are entrained in the film coated onto the surface of each weld portion. When some of these voids are connected through the coated film, a pin hole that allows communication between the weld portion and the outside is formed in the resin material. In a high-voltage application environment, entry of an electrolytic solution, such as salt water or car shampoo, into the pin hole causes insulation failure which is worse than in the conventional voltage environment.

SUMMARY

An embodiment provides a stator for an electric rotating machine, which applies insulating coating to weld portions forming windings of a stator to prevent the occurrence of insulation failure under the condition where high voltage is applied, and provides a manufacturing method of the stator.

As an aspect of the embodiment, the stator for an electric rotating machine includes: a stator core which has a plurality of slots; and a stator winding which is provided at the stator core, the stator winding having a plurality of conductor segments each of which includes an inner conducting body accommodated in the slot of the stator core and coil ends exposed from the slot, and weld portions which are connected with each other by welding the conductor segments at at least one of the coil ends, wherein the weld portions are annularly disposed with an interval therebetween, the weld portions are coated with an insulating resin material, and the resin material is formed of a plurality of layered insulating films.

DETAILED DESCRIPTION OF THE PREFERRED EMBODIMENTS

With reference to the accompanying drawings, hereinafter is described an embodiment. Throughout the drawings, components identical with or similar to each other are given the same numerals for the sake of omitting unnecessary explanation.

Figure 1:
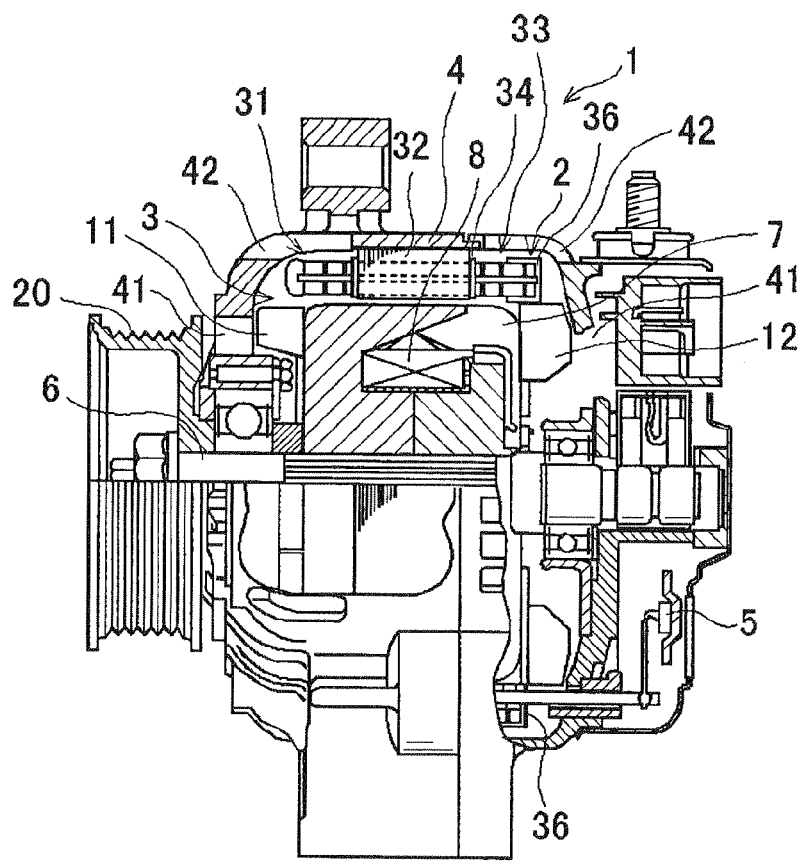
FIG. 1 is a cross-sectional view illustrating a general configuration of a vehicle alternator as a vehicular electric rotating machine according to an embodiment.

FIG. 1 is a cross-sectional view illustrating the general configuration of a vehicle alternator 1 as a vehicular electric rotating machine, according to the embodiment. As shown in FIG. 1, the vehicle alternator 1 includes a stator 2, a rotor 3, a frame 4 and a rectifier 5. The stator 2 includes a stator core 32, a plurality of conductor segments 33, an insulator 34 and a resin material 36. The plurality of segments 33 configure a stator winding. The insulator 34 electrically insulates between the stator core 32 and the conductor segments 33. The resin material 36 is formed in an annular shape, being imparted with insulation properties, to establish connection between weld portions at the tip ends of the respective conductor segments 33.

The stator core 32 is formed by stacking thin steel plates, with a number of slots being formed in the inner peripheral surface thereof. The conductor segments 33 exposed from the stator core 32 form coil ends 31 of the stator winding. The rotor 3 has a configuration in which pole cores 7 sandwich therebetween a field coil 8 from both sides via a shaft 6. The field coil 8 is formed of a copper wire that has been subjected to insulating treatment and cylindrically and concentrically wound up. The pole cores 7 each have six claw portions.

The pole core 7 on a front side has an end face to which an axial-flow cooling fan 11 is attached by welding or the like. The cooling fan 11 charges cooling air from the front side and axially and radially discharges the cooling air. Similarly, the pole core 7 on a rear side has an end face to which a centrifugal cooling fan 12 is attached by welding or the like. The cooling fan 12 charges cooling air from the rear side and discharges the cooling air in the radial direction.

The frame 4 accommodates the stator 2 and the rotor 3 and supports the rotor 3 so that the rotor 3 is rotatable about the shaft 6. Meanwhile, the stator 2 is fixed to the frame 4 so as to be located on an outer peripheral side of the pole cores 7 of the rotor 3, with a predetermined gap being interposed between the pole cores 7 and the stator 2. The frame 4 is provided with discharge ports 42 at positions facing the respective coil ends 31 of the stator 2 to discharge cooling air, and provided with charge ports 41 at respective axial end faces thereof.

In the vehicle alternator 1 having such a configuration, the rotor 3 rotates in a given direction upon transmission of torque to a pulley 20 from an engine, not shown, via a belt and the like. When excitation voltage is applied in this state from the outside to the field coil 8 of the rotor 3, the claw portions of the pole cores 7 are excited to allow the stator winding to generate three-phase alternating voltage, while a predetermined direct current is taken out from an output terminal of the rectifier 5.

Figure 2:
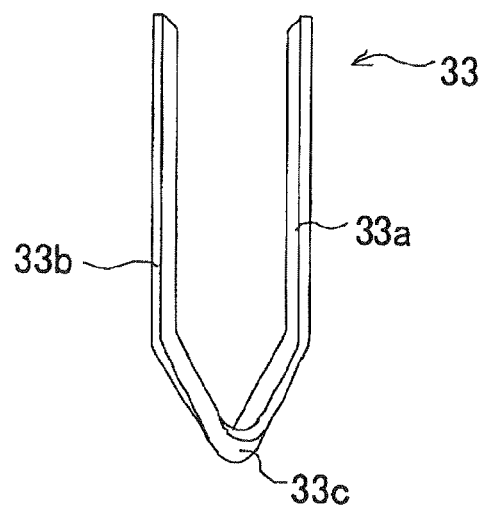
FIG. 2 is a perspective view of a conductor segment configuring a stator winding.

Hereinafter, the stator 2 is specifically described. FIG. 2 is a perspective view illustrating one of the conductor segments 33 configuring the stator winding. The conductor segment 33 shown in FIG. 2 is in a state before being assembled into the stator core 32. As shown in FIG. 2, each conductor segment 33 is formed by bending a rod-like or plate-like metal material (e.g., copper) at a turn portion 33c to provide a substantially U-shaped form. Each conductor segment 33 includes a conductor portion 33a that forms a segment layer disposed on an inner peripheral side of a slot, with reference to the turn portion 33c (this conductor portion is hereinafter referred to as an "inner-layer conductor portion 33a"), and a conductor portion 33b that also forms a segment layer disposed on an outer peripheral side of the slot, with reference to the turn portion 33c (this conductor portion is hereinafter referred to as an "outer-layer conductor portion 33b"). Each of these inner- and outer-layer conductor portions 33a and 33b includes an inner conducting body as a straight portion to be accommodated in a slot of the stator 2, and an outer conducting body exposed outside the slot to form one coil end 31. When a term "segment layer" is referred to herein, it means a layer configured by the conductor segments disposed in the same order position (same radial position) in the individual slots.

Figure 3:
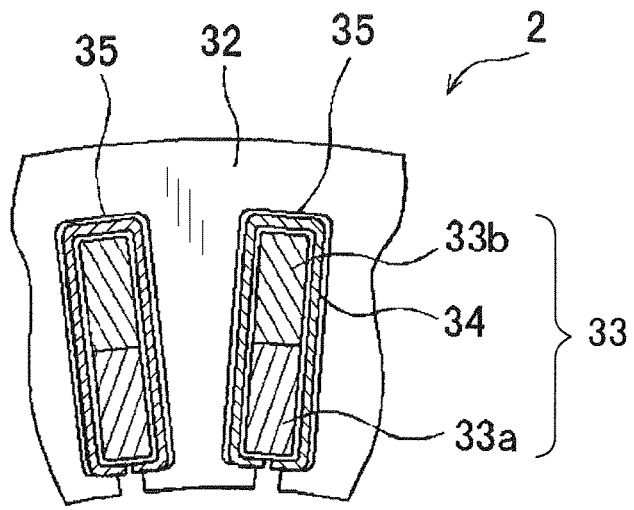
FIG. 3 is a partial cross-sectional view illustrating the stator.

FIG. 3 is a partial cross-sectional view illustrating the stator 2. The stator winding of the stator 2 has a configuration in which two conductor segments 33 are inserted into each slot 35 of the stator core 32, with weld portions at the tip ends of these conductor segments 33 being connected to the respective weld portions at the tip ends of the conductor segments 33 inserted into different slots 35. As shown in FIG. 3, the cross section, which is perpendicular to the direction of insertion into the slot 35, of each of these inner- and outer-layer conductor portions 33a and 33b of each conductor segment 33 has a rectangular shape having long sides in the radial direction and short sides in the circumferential direction. An insulating film 331 (see FIG. 6) is formed on the surfaces of the conductor segments 33. The adjacently located conductor segments 33 are insulated from each other by the insulating film 331 formed on the surface of each of the conductor segments 33. Each of the conductor segments 33 is insulated from the inner wall surface of the slot 35 by an insulator 34.

Figure 4:
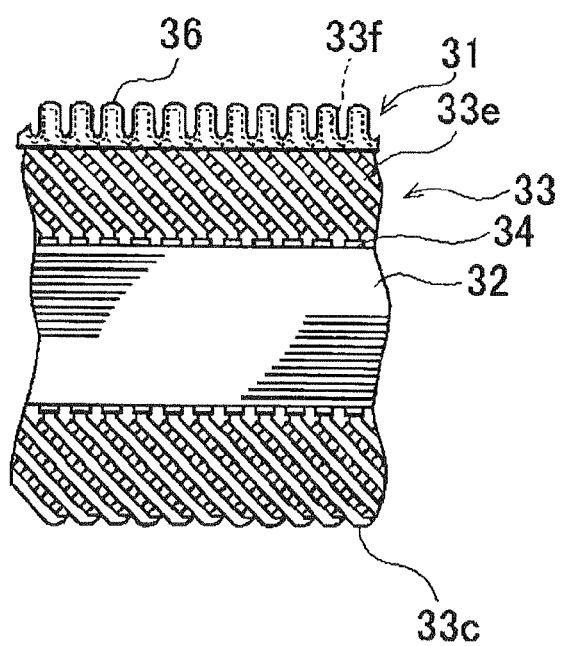
FIG. 4 is a partial side view illustrating the stator.

FIG. 4 is a partial schematic view of the stator 2. As shown in FIG. 4, each of the conductor segments 33 configuring the stator winding is disposed such that the turn portion 33c is located at one axial end face of the stator core 32 and that weld portions 33f at the tip ends, as aligned portions, on the opposite side of the turn portion 33c are located at the other axial end face.

In each conductor segment 33, the respective inner- and outer-layer conductor portions 33a and 33b are slanted to provide slant portions 33e. The slant portions 33e of the inner-layer conductor portions 33a are slanted in one direction and those of the outer-layer conductor portions 33b are slanted in the other direction, for crossing the former. In other words, the slant portions 33e of the inner-layer conductor portions 33a are all slanted in the same direction, while the slant portions 33e of the inner-layer conductor portions 33b are all slanted in the same direction. The slant portions 33e of the inner- and outer-layer conductor portions 33a and 33b of the conductor segments 33 configure one coil end 31 of the stator 2.

The weld portions 33f, each located closer to the end of the conductor segment 33 than the slant portion 33e is close to the end, may be electrically connected, such as by ultrasonic welding, arc welding and brazing, or may be mechanically connected, such as by caulking.

As shown in FIG. 4, the resin material 36 is continuously coated onto each weld portion 33f and a portion connecting between the adjacently located weld portions 33f (i.e. a part of the slant portion 33e). Thus, the resin material 36 annularly connects the weld portions 33f at the ends of the respective conductor segments 33 to exert high rigidity. As mentioned above, the area where the resin material 36 is coated includes a part of the slant portion 33e of each conductor segment 33. Therefore, it is unlikely that the resin material 36 as a whole will come off in the axial direction, whereby the resin material 36 is prevented from falling off even when vibration or heat is applied.

Further, the slant portions 33e of each conductor segment 33 are only partially coated with the resin material 36. In other words, most parts of the slant portions 33e are not adhered with the resin material 36. Accordingly, a meshed vent is formed by the slant portions 33e of the conductor segments 33, ensuring good cooling performance of the stator winding. Hereinafter, "the weld portion 33f and a portion connecting between the adjacently located weld portions 33f" is also referred to as "the weld portion 33f and a part of the slant portion 33e".

Figure 5:
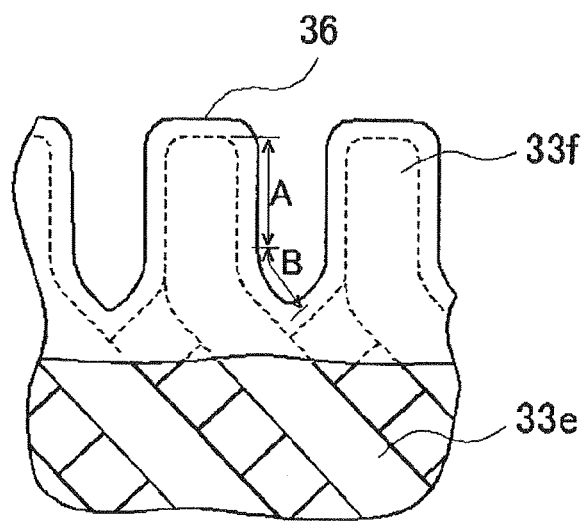
FIG. 5 is a side view illustrating a state in the vicinity of joints of the conductor segments.

When the weld portions 33f at the ends of the conductor segments 33 are joined to provide a joint, the joint and the vicinity thereof will be deteriorated due to the joining. For example, the surface of an area of each weld portion 33f, which area has been melted by welding, will be oxidized and the insulating coating around the area will be damaged. FIG. 5 is a diagram illustrating a state in the vicinity of each joint of the conductor segments 33. As shown in FIG. 5, when a joint is formed by welding, the surface of a melted area (area A) corresponding to a joined portion is seriously oxidized. Further, the insulating coating at the surface of an area (area B) adjacent to the melted area will be damaged or deteriorated due to the heat of the welding.

Such serious oxidization of the surface, or damage or deterioration of the insulating coating tends to degrade the adhesiveness of the resin material 36. For example, when the resin material 36 is obtained by thermosetting a powder, the adhesiveness is degraded between the surface of the conductor segment 33 corresponding to the areas A and B and the resin material 36, or between the surface of the conductor segment 33 and the deteriorated insulating coating. Therefore, in the present embodiment, as shown in FIG. 5, the coating region of the resin material 36 is ensured to cover not only the areas A and B but also the intact area, i.e. the undamaged or undeteriorated area, of the insulating coating further extending from the areas A and B. This coverage of coating region including the intact area of good adhesiveness allows the resin material 36 to exert strong adhesion to the conductor segments 33.

Hereinafter, manufacturing processes of the stator 2 will be described. First, the insulator 34 is inserted into each slot 35 of the stator core 32. Then, the conductor segments 33 of substantially the same U-shaped form each configured by the outer-layer conductor portion 33b and the inner-layer conductor portion 33a and the turn portion 33c, as shown in FIG. 2, are put one on the other so that the turn portions 33c are all located on the side of one axial end face of the stator core 32.

Then, as shown in FIG. 3, the conductor segments 33 are inserted into the respective slots 35 so as to be located inside the previously inserted respective insulators 34. In this case, each outer-layer conductor portion 33b is ensured to be located deep inside the slot 35 and each inner-layer conductor portion 33a is ensured to be located near the opening of the slot 35.

The conductor segments 33 are each fabricated by bending a flat copper plate provided with insulating coating, and forming the bent flat copper plate into a U-shaped form by pressing or the like. Each conductor segment 33 fabricated in this way is press-fitted to the slots 35 so that both side faces of each of the outer- and inner-conductor portions 33b and 33a are in contact, via the insulator 34, with the substantially parallel side faces of each slot 35.

Figure 6:
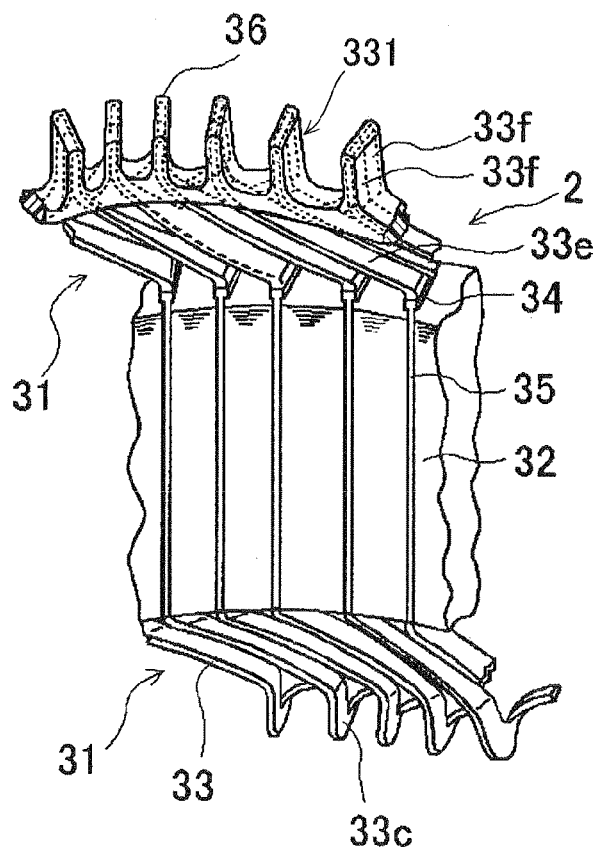
FIG. 6 is a perspective view specifically illustrating coil ends at both end faces of the stator.

FIG. 6 is a perspective view specifically illustrating the coil ends 31 at both end faces of the stator 2. As shown in FIG. 6, the coil end 31 made up of the turn portions 33c is on one side of the stator 2, while the coil end 31 made up of the weld portions 33f and the slant portions 33e is on the other side. The weld portions 33f at the tip ends of the conductor segments inserted in the same one slot 35 are bent in circumferentially opposite directions from each other. Then, the weld portions 33f of different conductor segments 33 in different segment layers are welded together for connection.

Figure 7:
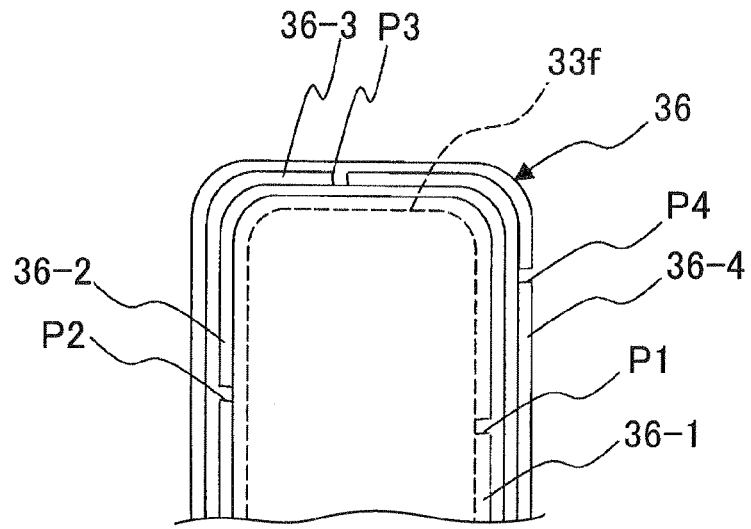
FIG. 7 is a view illustrating a layered configuration of a resin material coated on a weld portion of the stator.

FIG. 7 is a partial enlarged view illustrating a layered configuration of the resin material 36 coated on the weld portions of the conductor segments 33. As shown in FIG. 7, the resin material 36 coated on the weld portion 33f and a part of the slant portion 33e is formed of four insulating resin films 36-1 to 36-4. The insulating resin films 36-1 to 36-4 are each formed into a thin film so that the entry of voids, not shown, is reduced as much as possible. With a less number of voids, a less number of pin holes P1 to P4 will be formed, each pin hole being an integrally connected plurality of voids passing through the coated film. In addition, the pin holes P1 to P4 are likely to be formed in different positions of the resin films 36-1 to 36-4. Accordingly, the resin material 36 hermetically covers the weld portion 33f and a part of the slant portion 33e. As a result, the weld portion 33f and a part of the slant portion 33e are prevented from communicating with the outside via the pin holes P1 to P4.

Figure 8:
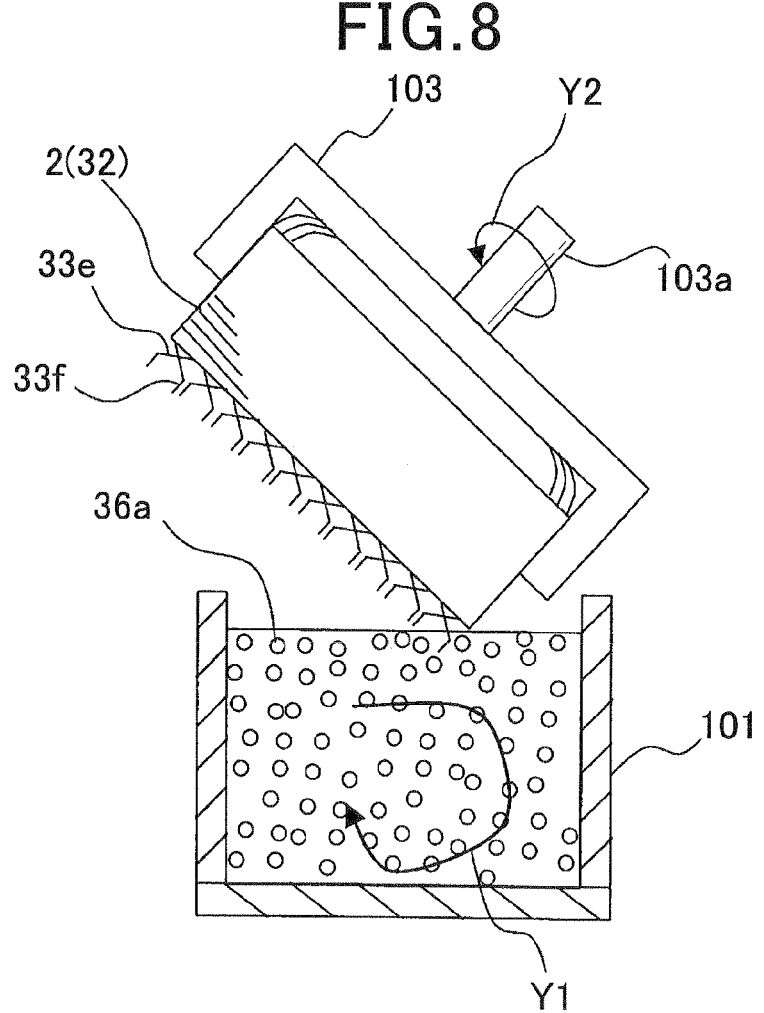
FIG. 8 is an explanatory view illustrating an insulating-coating method for the weld portions of the stator.

Referring now to FIG. 8, hereinafter is described a method of coating the weld portions 33f and parts of the slant portions 33e with the resin material 36. FIG. 8 is an explanatory view illustrating an insulating-coating method for the weld portions 33f of the conductor segments 33. In FIG. 8, powdered resin 36a of extremely fine particles is located in a vessel 101, while air is supplied to the powdered resin 36a, as indicated by an arrow Y1, for agitation. The stator 2 is held by a holder 103 having a rotary shaft 103a, with the stator core 32 being fitted to a recessed portion of the holder 103. The stator 2 held by the holder 103 in this way is inclined and supported by a support mechanism, not shown, so that the weld portions 33f and parts of the slant portions 33e of the stator 2 are immersed in the powdered resin 36a in the vessel 101.

In this state of supporting, the rotary shaft 103a is rotated as indicated by an arrow Y2 to sequentially coat the thin resin films 36-1 to 36-4. In rotating the stator 2, the speed of rotation is controlled so that, after coating the resin film 36-1 on each weld portion 33f and a part of each slant portion 33e, the subsequent resin film 36-2 is coated on the previously coated resin film 36-1. The four resin films 36-1 to 36-4 are sequentially coated while the rotary shaft 103a is rotated in this manner.

As described above, the stator 2 for a vehicular electric rotating machine according to the present embodiment includes the stator core 32 disposed opposed to the rotor 3, and the stator winding provided at the stator core 32. Further, the stator winding has a plurality of conductor segments 33 each of which includes the inner conducting bodies accommodated in the slots 35 of the stator core 32 and the coil end portions axially exposed from the slots 35 and extended in both circumferential directions. Each coil end portion of each conductor segment 33 includes the slant portion 33e crossing different conductor segments 33. Each slant portion 33e has a tip end at which the weld portion 33f is provided. The weld portions 33f of the conductor segments are annularly disposed with substantially an equal interval therebetween. Each weld portion 33f and a part of the slant portion 33e adjacent to the weld portion 33f are coated with the insulating resin material 36.

In this configuration, the present embodiment is characterized in that the resin material 36 is formed of a plurality of films (resin films 36-1 to 36-4), the plurality of films are coated one by one, each film having a thickness of minimizing the number of voids entrained therein, and the plurality of films are coated so that the positions of pin holes are different from one film to another, the pin holes each being formed by a plurality of voids being connected through each of the films.

Thus, the positions of the pin holes formed through each of the films configuring the resin material 36 are different from one film to another. Therefore, by forming the resin material 36 with multiple layers of films, the pin holes in the individual films will not be aligned throughout the films to allow the weld portion 33f and a part of the slant portion 33e to directly communicate with the outside of the resin material 36. Accordingly, the weld portions 33f and parts of the slant portions 33e are completely covered with the insulating resin material 36. As a result, an electrolytic solution, such as salt water or car shampoo, that has entered into an externally positioned pin hole will not reach the weld portion 33f and a part of the slant portion 33e. Thus, insulation failure is ensured not to be caused even in high-voltage application environment.

Figure 9:
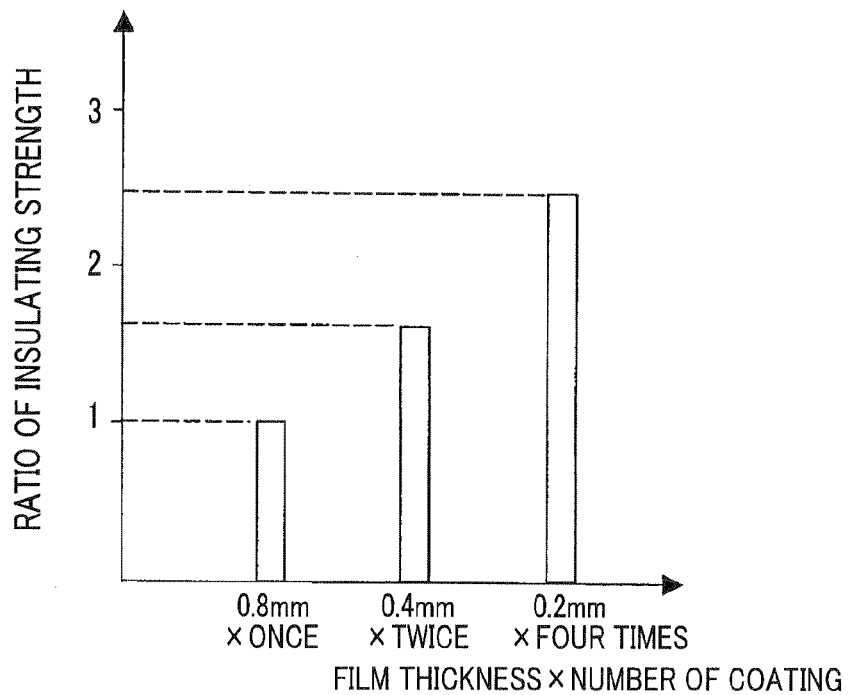
FIG. 9 is a diagram illustrating a relationship between a ratio of insulating strength of the resin material coated on the weld portions of the stator and "film thickness×number of coatings" of the resin material.

In this way, insulating strength is enhanced by forming the resin material 36 with multiple layers of films. An example is shown in FIG. 9. FIG. 9 is a diagram illustrating a relationship between a ratio of insulating strength of the resin material 36 coated on the weld portions 33f and "film thickness×number of coatings" of the resin material 36. In FIG. 9, the vertical axis indicates the ratio of insulating strength and the horizontal axis indicates the "film thickness×number of coatings" of the resin material 36.

Let us assume that the conventional thickness of the resin material 36 is 0.8 mm and that the ratio of the insulating strength in this case is "1". When a film of 0.4 mm thick is formed by one coating, the ratio of insulating strength resulting from twice of such coating using the coating method of the present embodiment is about "1.6". When a film of 0.2 mm thick is formed by one coating, the ratio of the insulating strength resulting from four times of such coating is about "2.5". As will be understood from these results, the smaller the thickness of each film is in a plurality of times of coatings for attaining a predetermined thickness of the resin material 36, the higher becomes the insulating strength of the resin material 36.

As described above, the resin material 36 is used for the insulating coating of the weld portions 33f of the conductor segments 33 of the stator 2. As an insulating-coating method, the powdered resin 36a that has insulation properties and forms films of the resin material 36 by being superheated is located in the vessel 101 and agitated with the supply of air. Meanwhile, the stator 2 is held by the rotation mechanism so that the annularly disposed weld portions 33f are revolved in the circumferential direction about the center of the annularly disposed weld portions 33f and that the rotary shaft of the stator 2 is inclined. The weld portions 33f and parts of the slant portions 33e of the conductor segments 33 of the stator 2 held in this way are superheated, followed by the rotation of the stator 2 by the rotation mechanism to immerse the weld portions 33f and parts of the slant portions 33e into the powdered resin 36a in the vessel 101.

The stator 2 is rotated such that the film formed by one revolution of the weld portions 33f and parts of the slant portions 33e for immersion will have a thickness that easily allows air to come out of the film, forms a less number of voids in the film, and thus barely allows formation of pin holes with the voids being connected through each film. After rotating the stator 2 a plurality of times, the weld portions 33f and parts of the slant portions 33e are drawn out of the vessel 101, followed by superheating to thereby provide the resin material 36.

With this method, the film formed with one revolution of the weld portions 33f and parts of the slant portions 33e will have a less number of voids therein. Therefore, it is unlikely that a pin hole is formed with a plurality of voids being connected and passed through each film. If any pin holes are formed, the number will be small. Since a pin hole is formed when a plurality of voids in a film are happened to be connected through the film, the positions of the pin holes formed in the films with the previous revolution and the following revolutions will be substantially different from one film to another. Accordingly, the pin holes of the individual films will not be aligned throughout the films for direct communication of the weld portion 33f and a part of the slant portion 33e with the outside of the resin material 36. Should such an alignment of the pin holes occur, the probability will be extremely low. In this way, the weld portions 33f and parts of the slant portions 33e are almost completely covered with the insulating resin material 36. As a result, an electrolytic solution, such as salt water or car shampoo, that has entered into an externally positioned pin hole will not reach the weld portion 33f and a part of the slant portion 33e. Thus, insulation failure is ensured not to be caused even in high-voltage application environment.

As described above, one rotation of the stator 2 is performed such that the film will have a thickness that allows formation of a less number of voids and is unlikely to allow formation of a pin hole through the film with the voids being connected. With such a manner of rotation of the stator 2, the resin material 36 of the same thickness can be coated faster than in the conventional art. For example, suppose it takes four seconds to achieve immersion once in coating the resin material 36 having a conventional one-layer configuration. In this regard, in the present embodiment, it takes 0.5 seconds in coating one layer of the resin material 36 having a thickness that allows formation of a less number of voids and is unlikely to allow formation of a pin hole through the film with the voids being connected. Moreover, the immersion only has to be repeated seven times in the present embodiment to achieve the same thickness of the resin material 36 as that of the conventional art.

In the conventional art, the amount of adhesion of the resin material has been decreased because the temperature at the weld portions to be adhered with the resin material is decreasing in the vessel of the powdered resin. In this regard, according to the method of the present embodiment, the heat of the stator core is transferred to the weld portions while the stator is rotated after formation of one layer. Accordingly, the temperature of the weld portions is less decreased and thus the amount of adhesion is suppressed from being decreased. In this way, in the method of the present embodiment, the resin material 36 having the same thickness as that of the conventional art can be formed in 0.5×7=3.5 seconds which time is shorter than in the conventional art. As a result, the number of fabrication processes is reduced to thereby reduce the cost of each product.

The resin material 36 coated in this way is annularly provided in the circumferential direction of the stator 2, while joining the weld portions 33f at the tip ends of the conductor segments 33. Accordingly, high rigidity is attained to thereby prevent, for example, deformation of the coil end 31, occurrence of vibration/noise, and contact between adjacent conductor segments 33. Also, the resin material 36 covering the weld portions 33f including the joints also functions as a protection material for reliably protecting the joints. In addition, since the resin material 36 is adhered extending from each weld portion 33f to a part of each slant portion 33e, the adhesion of the resin material 36 is reinforced in the axial direction. Accordingly, the resin material 36 is prevented from falling off due to vibration or the like.

Since the resin material 36 is only partially adhered to each slant portion 33e, sufficient space is ensured through which cooling air passes. Accordingly, good radiation performance is achieved and thus the temperature at the time of electric generation is decreased. Further, the resin material 36 is formed into a corrugated shape along the surfaces of the weld portions 33f and the thickness of the resin material 36 is substantially constant in the vicinity of each weld portion 33f including the joint. Specifically, there is neither an extremely thick portion nor an extremely thin portion, and thus variation in the degree of expansion/contraction is mitigated to thereby mitigate damage of the resin material 36. Since the resin material 36 will not be damaged, the occurrence of corrosion, electrical short circuit or the like is prevented, which would otherwise be caused by the entry of water or the like. If a liquid resin different from the resin material 36 is adhered after coating the resin material 36, the adhesion by the resin material 36 will be further reinforced. The liquid resin may be flowed into a gap axially formed at the entrance of the slot 35 of the stator core 32, i.e. between the conductor segments 33 and the slot 35, to enhance the degree of connection between the conductor segments 33 and the stator core 32. In this way, by changing materials of the two resins and portions of adhesion, the range of application of the resins can be extended, besides the reinforcement of the mutual connection of the conductor segments 33.

It will be appreciated that the present invention is not limited to the configurations described above, but any and all modifications, variations or equivalents, which may occur to those who are skilled in the art, should be considered to fall within the scope of the present invention.

Figure 10:
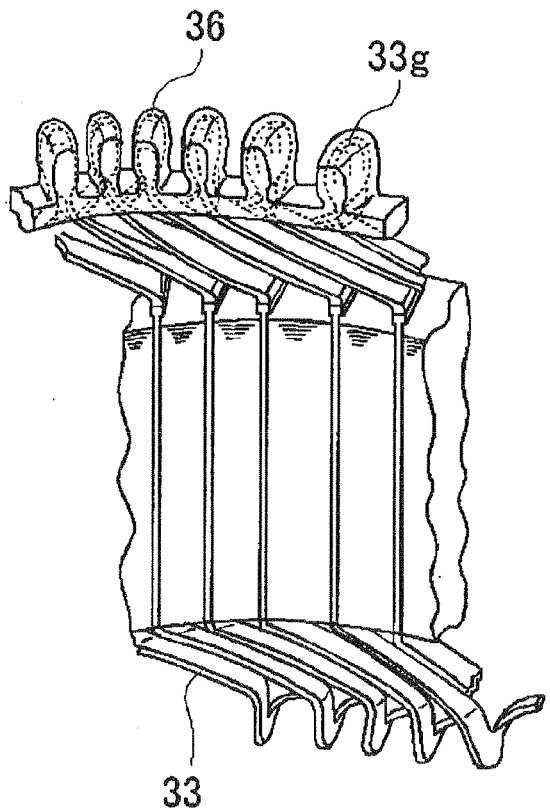
FIG. 10 is a partial perspective view illustrating a stator with weld portions each formed into a spherical shape.

For example, in the above embodiment, the joints of the conductor segments 33 are permitted to have a substantially identical cross sectional shape. Alternatively, the joints may each have a thick end. FIG. 10 is a partial perspective view illustrating a stator with joints each having a spherical shape. For example, if the weld portions at the ends of the respective conductor segments 33 are joined by TIG (tungsten inert gas) welding, each joint 33g as a whole will be rounded by the surface tension and thus will have an edgeless shape that is a spherical shape like a drop. Generally, the TIG welding is performed by generating an arc between a tungsten electrode and a base material in an inert gas atmosphere and melting the base material using the arc heat. When the conductor segments 33 are made of copper having high heat conductivity, the melted copper at the time of welding extends to the vicinity of the joint 33g, resulting in the joint 33g as a whole having a spherical shape. The joint 33g has a cross-sectional dimension larger than that of the wires of the conductor segments 33 configuring the joint. Accordingly, the joint 33g, as viewed from its base portion, is formed into a shape having a thick end. Thus, the resin material 36 which is coated covering the joints 33g is unlikely to come off, and thus is prevented from falling off due to vibration or the like.

It is important that the cross section of the thick end of the joint 33g is larger than that of the conductor segment 33. It is desirable that the thick end of the joint is thicker than the conductor segment 33 which configures the joint and has a rectangular cross section. In other words, it is desirable that the thick end of the joint is thicker than the conductor segment 33 both in the width direction and in the thickness direction. However, the thick end may be thicker only in either one of the width direction and the thickness direction. In such a shape as well, the resin material 36 can be adhered extending down to the base of each joint having a thick end to thereby wrap the thick end area. Use of such a shape can reinforce the adhesion of the resin material 36.

Figure 11:
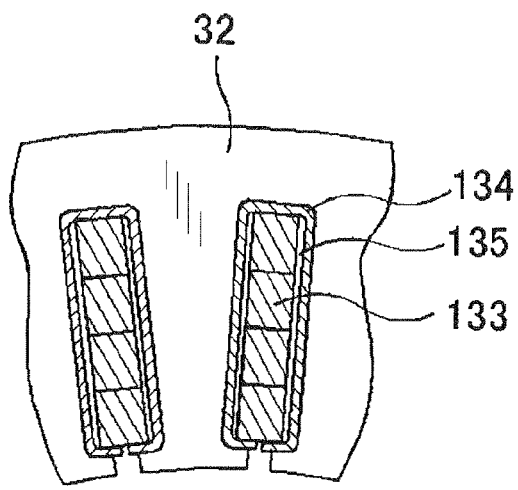
FIG. 11 is a partial cross-sectional view illustrating a stator in which four conductor segments are inserted into each slot.
Figure 12:
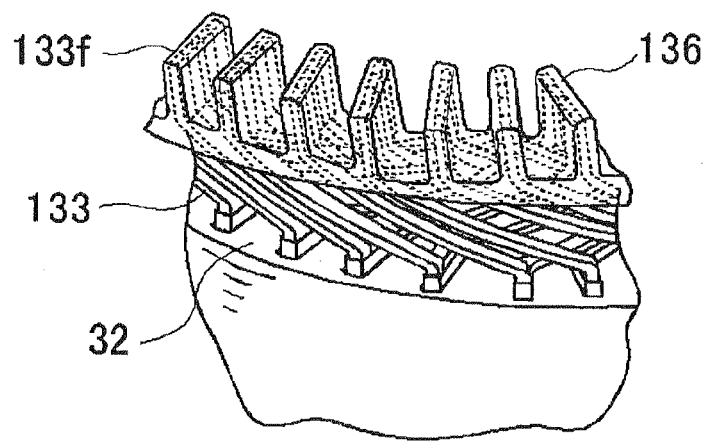
FIG. 12 is a partial perspective view illustrating the stator in which four conductor segments are inserted into each slot.

In the embodiment described above, the number of conductors per one slot 35 has been two. Alternatively, the number of the conductors per one slot 35 may be increased. FIG. 11 is a partial cross-sectional view illustrating a stator in which four conductor segments are inserted into each slot. Specifically, as shown in FIG. 11, for example, four conductor segments 133 may be aligned, for accommodation, only in the depth direction in each slot 135 formed in the stator core 32. In such a structure, a joint structure as shown in FIG. 12 can be used. The four conductor segments 133 accommodated in one slot 135 are alternately extended in a different circumferential direction. In FIG. 12, the slant portions of the conductor segments 133 configuring an outermost peripheral segment layer, i.e. disposed on the front side as viewed in the figure, are extended clockwise, while the slant portions configuring an innermost peripheral segment layer, i.e. disposed on the rear side as viewed in the figure, are extended counterclockwise. The weld portion 133f at the tip end of one conductor segment 133 disposed in one slot 135 is joined to the weld portion 133f at the tip end of a different conductor segment 133 extending from a different slot 135 which is distanced by a predetermined pitch from the former slot 135.

In FIG. 12, the innermost conductor segments 133 are joined to the respective conductor segments 133 configuring a secondly inner segment layer, and the conductor segments 133 in a thirdly inner segment layer are joined to the respective conductor segments 133 configuring the outermost segment layer. A resin material 136 is coated to cover at least the weld portions 133f at the tip ends of the respective conductor segments 133.

Figure 13:
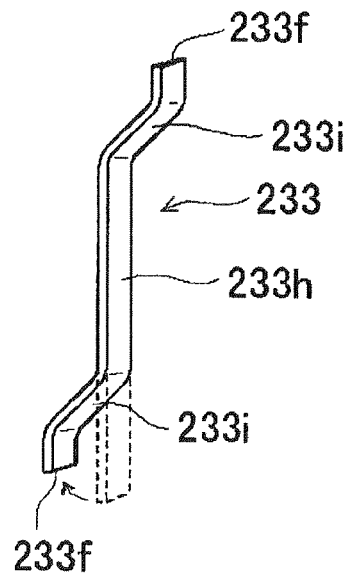
FIG. 13 is a perspective view illustrating a conductor segment with no turn portion.

In the embodiment described above, the substantially U-shaped conductor segments 33 have been used, the conductor segments 33 each having the turn portion 33c on one end face of the stator core 32. Alternatively, conductor segments 233 each having a shape as shown in FIG. 13 may be used. FIG. 13 is a perspective view illustrating the conductor segment 233 with a shape that may be called an I-shaped or J-shaped form. Specifically, as shown in FIG. 13, each conductor segment 233 has a shape without a turn portion, which shape corresponds to one half of the U-shaped conductor segment 33 separated at the turn portion 33c. Using such conductor segments 233, both ends of each of the conductor segments 233 may be joined. The conductor segment 233 shown in FIG. 13 is configured by an inner conducting body 233h that is a straight portion inserted into the slot 35 of the stator core 32, slant portions 233i provided at both ends of the inner conducting body 233h and extended in the axial direction of the stator core 32, and weld portions 233f formed at the ends of the respective slant portions 233i. At least one of the two slant portions 233i is obtained by bending the conductor segment 233, after insertion into the slot 35, from a state as indicated by broken lines in the figure.

Figure 14:
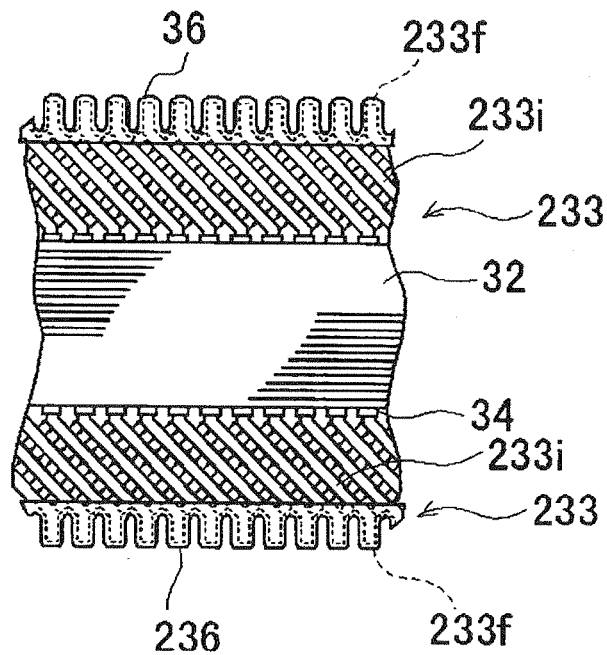
FIG. 14 is a partial side view illustrating a stator configured by using the conductor segment illustrated in FIG. 13.

FIG. 14 is a partial side view illustrating a stator configured by using the conductor segments 233 illustrated in FIG. 13. As shown in FIG. 14, the weld portion 233f is joined, for connection, to the weld portion 233f of a different conductor segment 233 inserted into a different slot 35. After that, adjacently located joints are coated with a resin material 236 to form a stator winding as a whole. The simple shape of the conductor segment 233 has an advantage of facilitating manufacture. In addition, since each conductor segment 233 and each insulator 34 can be mated on a one-to-one basis, the work of inserting the insulator 34 into the slot 35 and further inserting the conductor segment 233 into the insulator 34 is facilitated.

In the embodiment described above, the weld portions 33f at the tip ends of the respective conductor segments 33 have been annularly coated with the resin material 36. The resin material 36, however, may not necessarily be a single resin material, but may be a combination of two or more materials. Further, the slant portions 33e of the conductor segments 33 may not necessarily be slanted in both of the inner and outer segment layers. Instead, the slant portions 33e in either one of the segment layers may be extended along the axial direction, and only those in the other one of the segment layers may be slanted.

In the above embodiment, a part of each slant portion 33e has been covered with the resin material 36. Alternatively, a larger area of the slant portion 33e may be adhered with the resin material 36 more sparsely (thinner) than in the weld portion 33f. In this case as well, gaps are formed by the crossing of the slant portions 33e of the respective conductor segments 33 to serve as a vent for the cooling air, whereby good cooling performance is ensured.

In the above embodiment, the resin material 36 has been formed into a corrugated shape that goes along the shape of the weld portion 33f at the tip end of each conductor segment 33. Alternatively, the resin material 36 may be formed into a simple ring shape without corrugation. In this case as well, rigidity is enhanced to prevent deformation of the coil ends, generation of vibration/noise, contact between the adjacently located conductor segments 33, and the like. In addition, since the gaps can be ensured at the slant portions for the flow of the cooling air, good cooling performance is ensured.

Figure 15:
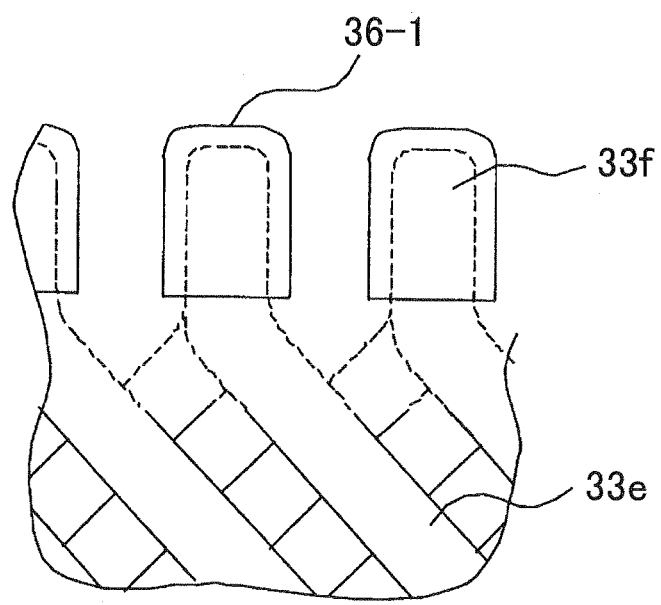
FIG. 15 is a diagram illustrating a state where only weld portions of a stator are coated with a resin material.

FIG. 15 is a diagram illustrating a state where only weld portions 33f of a stator are coated with a resin material 36-1. As shown in FIG. 15, the resin material 36-1 may be coated only onto the weld portions 33f so that the weld portions 33f covered with the resin material are independent of each other.

In a method of independently coating the resin material 36-1 onto each weld portion 33f, only the weld portions 33f of the conductor segments 33 of the stator 2 held by the holder 103 shown in FIG. 8 are immersed in the powdered resin 36a in the vessel 101. The stator 2 is rotated for immersion to coat a film of the resin material 36-1 onto each of the weld portions 33f. In this case, the stator 2 is rotated such that the film resulting from one rotation will have a thickness with which a less number of voids are formed therein and pin holes are unlikely to be formed with the voids being connected through the film. After rotating the stator 2 a plurality of number of times, the weld portions 33f are drawn out of the vessel 101, followed by superheating to thereby provide the resin material 36-1.

According to this method, the resin material 36-1 is coated only onto the weld portions 33f which are annularly disposed with a substantially equal interval therebetween. With this method as well, the same advantages as in the case of the resin material 36 described above are obtained. With this method, the adjacently located weld portions 33f are not connected with each other via the resin material 36-1 that would otherwise have been coated onto a part of each slant portion 33e. Accordingly, a creepage distance between the adjacently located weld portions 33f is ensured, and thus electrical discharge can be eliminated from between the adjacently located weld portions 33f.

Figure 19:
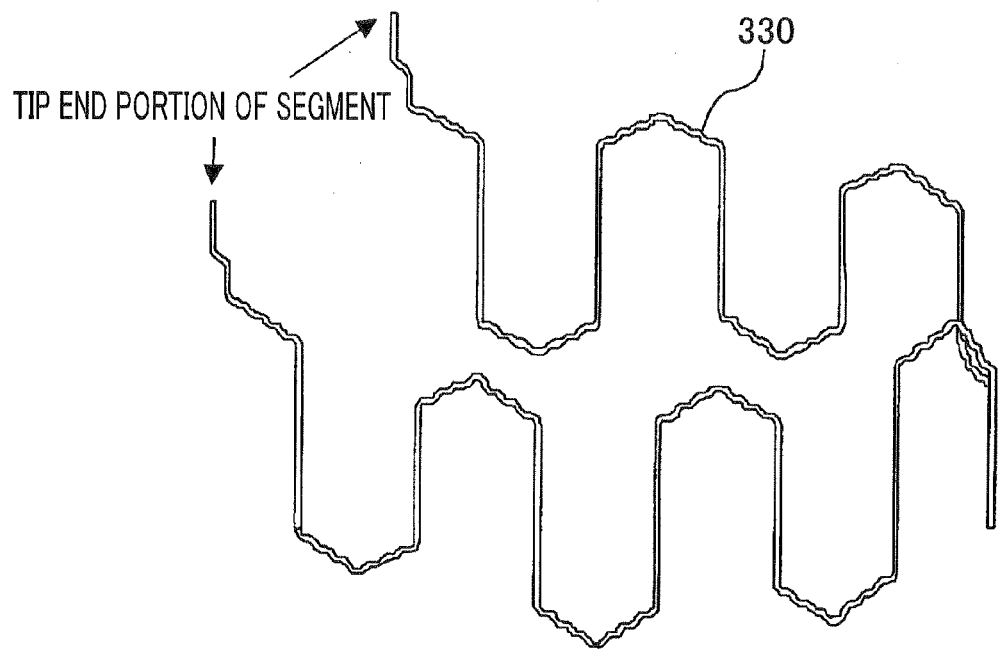
FIG. 19 is a diagram illustrating the configuration of different conductor segments configuring a stator winding.

Alternatively, a plurality of the U-shaped conductor segments 33 shown in FIG. 2 may be connected as indicated by a reference numeral 330 in FIG. 19. Then, these conductor segments 330 may be disposed along the circumference of a stator core so as to be accommodated in the respective predetermined slots.

Figure 16:
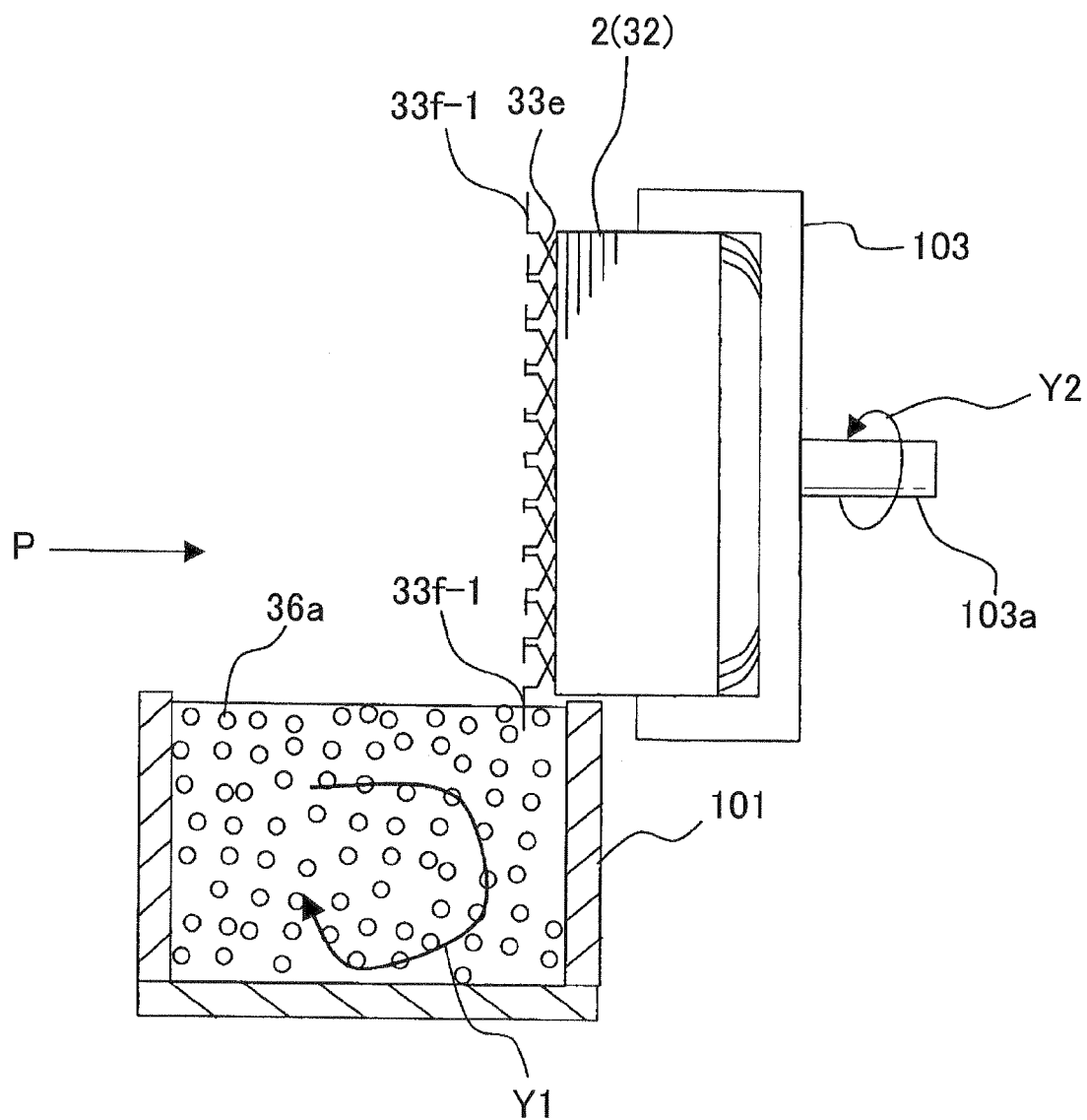
FIG. 16 is an explanatory view illustrating another insulating-coating method for weld portions of a stator.
Figure 17:
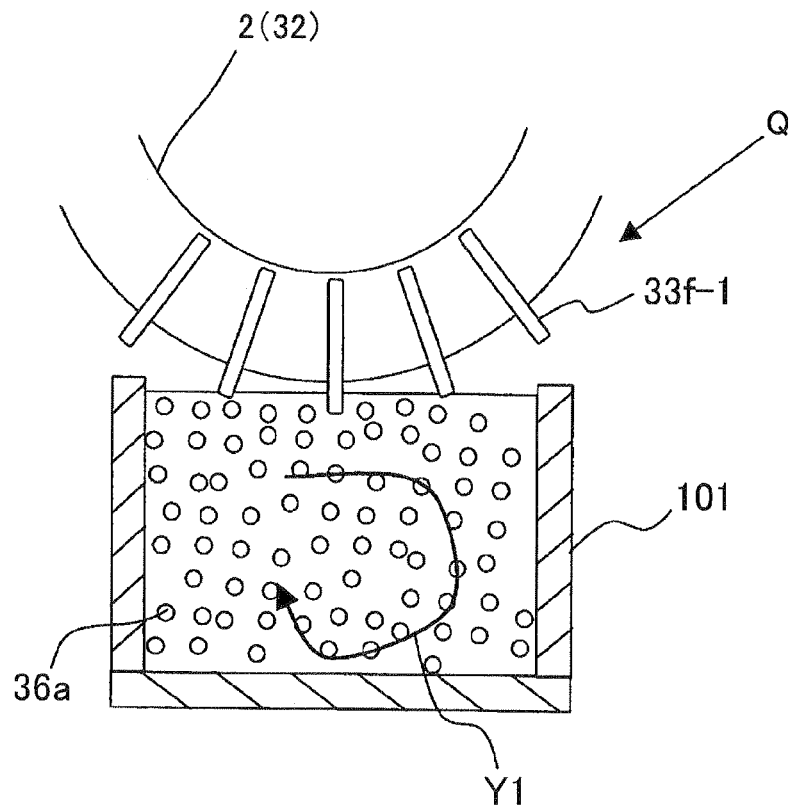
FIG. 17 is a diagram illustrating the stator illustrated in FIG. 16, as viewed from the side of an arrow P.
Figure 18:
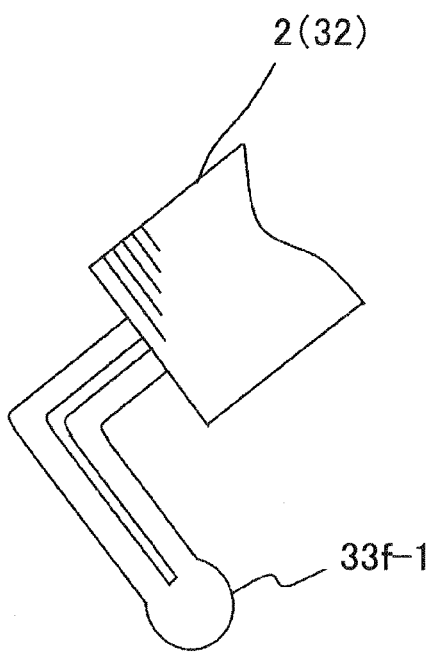
FIG. 18 is a diagram illustrating a weld portion of the stator illustrated in FIG. 17, as viewed from an arrow Q.

With reference to FIGS. 16 to 18, hereinafter is described a method of insulating-coating of the weld portions of these conductor segments. FIG. 16 is a diagram illustrating the stator 2 held by the holder 103, and the vessel 101 in which powdered resin material is located. FIG. 17 is a diagram illustrating the stator 2 illustrated in FIG. 16, as viewed from an arrow P of FIG. 16. FIG. 18 is a diagram illustrating a weld portion 33f-1 of the stator 2 illustrated in FIG. 17, as viewed from an arrow Q of FIG. 17.

Specifically, as shown in FIGS. 16 to 18, tip end portions of the plurality of connected conductor segments are bent outward in the radial direction with respect to the annular outline of the stator 2. The weld portions 33f-1 at these bent tip ends are annularly disposed with a substantially equal interval therebetween. As shown in FIG. 16, when the weld portions 33f-1 are going to be coated with the resin material 36-1, the stator 2 is held by the rotation mechanism such that the weld portions 33f-1 are revolved along the circumferential direction about the center of the annular outline of the stator 2 and that the rotary shaft 103a is in parallel with the surface of the powdered resin 36a in the vessel 101, the surface being a boundary between the powdered resin 36a and the outside.

Then, the weld portions 33f-1 of the stator 2 held are superheated, followed by rotating the stator 2 by the rotation mechanism so that only the weld portions 33f-1 are immersed in the powdered resin 36a in the vessel 101. In this case, the stator 2 is rotated for immersion such that the film coated with one revolution of the weld portions 33f-1 will have a thickness that causes a less number of voids and thus is unlikely to be formed with a pin hole through the film with the voids being connected. After rotating the stator 2 several number of times, the weld portions 33f-1 are drawn out of the vessel 101 and superheated to provide the resin material 36-1.

According to this method, the resin material 36-1 is easily coated only onto the weld portions 33f-1 annularly disposed with substantially an equal interval therebetween. This is because the weld portions 33f-1 are formed by bending radially outward (in a direction of making a diameter large) a tip end portion of each of the plurality of conductor segments of the stator 2, the bent tip ends are welded, and the weld portions 33f-1 are annularly disposed with substantially an equal interval therebetween. Thus, when the resin material 36-1 is going to be provided only at the weld portions 33f-1, the rotary shaft for revolving the radially bent and annularly disposed weld portions 33f-1 has to be made parallel to the boundary surface of the powdered resin 36a in the vessel 101. In this case, the stator 2 has to be vertically lifted down toward the vessel 101 so as to be orthogonal to the boundary surface to immerse only the weld portions 33f-1 in the powdered resin 36a in the vessel 101. In this way, the resin material 36-1 is easily coated only onto the weld portions 33f-1.

As described above, a tip end portion of each of the plurality of conductor segments 33 is bent radially outward with respect to the annular outline of the stator 2, and the weld portions 33f-1 at the bent tip ends are annularly disposed with substantially an equal interval therebetween. As a result, the interval between the annularly disposed weld portions 33f-1 becomes larger. Accordingly, coating only the weld portions 33f-1 disposed in this way can enhance insulation properties by that much of the larger degree of the interval.

In the insulating-coating method for the weld portions explained referring to FIGS. 16 to 18, only the weld portions 33f-1 are immersed in the powdered resin 36a in the vessel 101 to provide the resin material 36-1 at the weld portions 33f-1. Alternatively, not only the weld portions 33f-1 but also the portions each connecting the adjacently located weld portions (i.e. parts of the slant portions 33e) may be immersed in the powdered resin 36a in the vessel 101. In this case as well, similar to the case of immersing only the weld portions 33f-1, the resin material 36-1 can be provided at the weld portions 33f-1 and at the portions each connecting the adjacently located weld portions. Also, in this case as well, the effect similar to the case of immersing only the weld portions 33f-1 can be exerted. It should be appreciated that the insulating-coating method for the weld portions explained referring to FIG. 8 may be applied to the conductor segment 330 shown in FIG. 19.

As a matter of course, the stator for a vehicular electric rotating machine and the insulating-coating method for the weld portions of the stator according to the present embodiment can be applied to motor-generators for hybrid vehicles, which perform driving and electric generation with high voltage, to enhance insulation properties.

Hereinafter, aspects of the above-described embodiments will be summarized.

As an aspect of the embodiment, a stator for an electric rotating machine, including: a stator core which has a plurality of slots; and a stator winding which is provided at the stator core, the stator winding having a plurality of conductor segments each of which includes an inner conducting body accommodated in the slot of the stator core and coil ends exposed from the slot, and weld portions which are connected with each other by welding the conductor segments at at least one of the coil ends, wherein the weld portions are annularly disposed with an interval therebetween, the weld portions are coated with an insulating resin material, and the resin material is formed of a plurality of layered insulating films.

In the above stator, the plurality of layered insulating films are formed so that positions of pin holes are different from one film to another, the pin holes each being formed by a plurality of voids being connected through each of the insulating films.

According to these configurations, the positions of the pin holes formed through the individual insulating films configuring the resin material are different from one film to another. Therefore, forming the resin material with the plurality of layered insulating films can prevent alignment of the pin holes throughout the insulating films to thereby prevent the weld portions from directly communicating with the outside of the resin material. Accordingly, each weld portion is completely covered with the insulating resin material. As a result, an electrolytic solution, such as salt water or car shampoo, that has entered into an externally positioned pin hole will not reach the weld portion and a part connecting between the adjacently located weld portions. Thus, insulation failure is ensured not to be caused even in a high-voltage application environment.

In the above stator, the resin material covers the weld portions so that the covered weld portions are independent of each other.

According to this configuration, the adjacently located weld portions will not be connected with each other by the resin material covering the weld portions. Accordingly, a creepage distance between the adjacently located weld portions can be ensured, and thus electrical discharge can be eliminated from between the adjacently located weld portions.

In the above stator, tip ends of the plurality of the conductor segments are bent outward in the radial direction of the stator, and the weld portions at the bent tip ends are annularly disposed with an interval therebetween.

According to this configuration, the interval between the annularly located weld portions becomes larger, and thus the insulation properties are enhanced by that much of the larger degree of the interval.

In the above stator, the resin material covers the weld portions and parts which connect between the adjacently located weld portions.

According to this configuration, since the resin material covers not only the weld portions but also the parts which connect between the adjacently located weld portions, the effects described above are produced at not only the weld portions but also the parts.

As another aspect of the embodiment, a manufacturing method of a stator for an electric rotating machine, the stator including a stator core which has a plurality of slots; and a stator winding which is provided at the stator core, the stator winding having a plurality of conductor segments each of which includes an inner conducting body accommodated in the slot of the stator core and coil ends exposed from the slot, and weld portions which are connected with each other by welding the conductor segments at at least one of the coil ends, includes: using a vessel in which insulating powdered resin, which forms an insulating film forming the resin material, is located and air is supplied for agitating the powdered resin; heating the weld portions of the rotor, and thereafter immersing the weld portions into the vessel while rotating the stator; and drawing out the weld portions from the vessel, after rotating the stator a plurality of times, thereby forming the insulating film of the resin material.

According to this method, a less number of voids are formed in the insulating film which is provided with one revolution of the weld portions of the stator. Accordingly, pin holes are unlikely to be formed by a plurality of voids being connected through the film. If any pin holes are formed, the number will be small. Since a pin hole is formed when a plurality of voids in an insulating film are happened to be connected through the film, the positions of the pin holes formed in the insulating films with the previous revolution and the following revolution will be substantially different from one film to another. Accordingly, the pin holes of the individual insulating films will not be aligned throughout the insulating films for direct communication of the weld portion and a part connecting the adjacently located weld portions, with the outside of the resin material. Should such an alignment of the pin holes occur, the probability will be extremely low. In this way, the weld portions are almost completely covered with the insulating resin material. As a result, an electrolytic solution, such as salt water or car shampoo, that has entered into an externally positioned pin hole will not reach the weld portions. Thus, insulation failure is ensured not to be caused even in high-voltage application environment.

As described above, one rotation of the stator is performed such that the insulating film will have a thickness that allows formation of a less number of voids and is unlikely to allow formation of a pin hole through the insulating film with the voids being connected. With such a manner of rotation of the stator, the resin material of the same thickness can be coated faster than in the conventional art. For example, suppose it takes four seconds to achieve immersion once in coating the resin material formed of the insulating film having a conventional one-layer configuration. In this regard, in the present embodiment, one rotation of 0.5 seconds can achieve coating of one layer of the insulating film, and the layer will have a thickness that allows formation of a less number of voids and is unlikely to allow formation of a pin hole through the insulating film with the voids being connected. Moreover, the rotation only has to be repeated seven times in the present embodiment to achieve the same insulating film as that of the conventional art.

In the conventional art, the amount of adhesion of the resin material has been decreased because the temperature at the weld portions to be adhered with the resin material is decreasing in the vessel for the powdered resin. In this regard, according to the method of the present embodiment, the heat of the stator core is transferred to the weld portions while the stator is rotated after formation of one layer. Accordingly, the temperature of the weld portions is less decreased and thus the amount of adhesion is suppressed from being decreased. In this way, in the method of the present embodiment, the resin material having the same thickness as that of the conventional art can be formed in 0.5×7=3.5 seconds which time is shorter than in the conventional art. As a result, the number of fabrication processes is reduced to thereby reduce the cost of each product.

In the above method, tip ends of the plurality of the conductor segments are bent outward in the radial direction of the stator, and the weld portions at the bent tip ends are annularly disposed with an interval therebetween.

According to this method, the interval between the annularly located weld portions becomes larger, and thus the insulation properties are enhanced by that much of the larger degree of the interval.

In the above method, the resin material is formed on the weld portions and parts which connect between the adjacently located weld portions.

According to this method, since the resin material covers not only the weld portions but also the parts which connect between the adjacently located weld portions, the effects of the above manufacturing method are produced at not only the weld portions but also the parts.

What is claimed is:

1. A stator for an electric rotating machine, comprising:
a stator core which has a plurality of slots; and
a stator winding which is provided at the stator core, the stator winding having a plurality of conductor segments each of which includes at least one inner conducting body accommodated in one of the slots of the stator core and coil ends exposed from the slot, the plurality of conductor segments including weld portions which are connected with each other by welding the conductor segments at at least one of the coil ends, wherein
the weld portions are coated with an insulating resin material,
the resin material is formed of a plurality of layered insulating films, the layered insulating films being formed of a single material,
tip ends of the plurality of conductor segments are bent outward in the radial direction of the stator,
the weld portions at the bent tip ends are annularly disposed with an interval therebetween, and
the plurality of layered insulating films comprises four insulating films.

2. The stator according to claim 1, wherein
the plurality of layered insulating films are formed so that positions of pin holes are different from one film to another, the pin holes each being formed by a plurality of voids being connected through each of the insulating films.

3. The stator according to claim 1, wherein
the resin material covers the weld portions so that the covered weld portions are independent of each other.

4. The stator according to claim 1, wherein
the resin material covers the weld portions and parts which connect between the adjacently located weld portions.

5. The stator according to claim 1, wherein each interval between the weld portions at the bent tip ends is substantially equal in size.

* * * * *

UNITED STATES PATENT AND TRADEMARK OFFICE
CERTIFICATE OF CORRECTION

PATENT NO. : 8,884,488 B2
APPLICATION NO. : 13/472783
DATED : November 11, 2014
INVENTOR(S) : Nakamura et al.

Page 1 of 1

It is certified that error appears in the above-identified patent and that said Letters Patent is hereby corrected as shown below:

Title page at Item (73) "Assignee", please correct "Denso Corporation, Kariya (JP)" to read as follows:

—DENSO CORPORATION, Kariya (JP)—

—TOYOTA JIDOSHA KABUSHIKI KAISHA, Toyota-shi (JP)—.

Signed and Sealed this
Second Day of August, 2016

Michelle K. Lee
*Director of the United States Patent and Trademark Office*